Jan. 15, 1963 J. P. REYNOLDS 3,073,020
METHOD OF FORMING A ONE PIECE TUBULAR T MEMBER
Filed Sept. 5, 1956
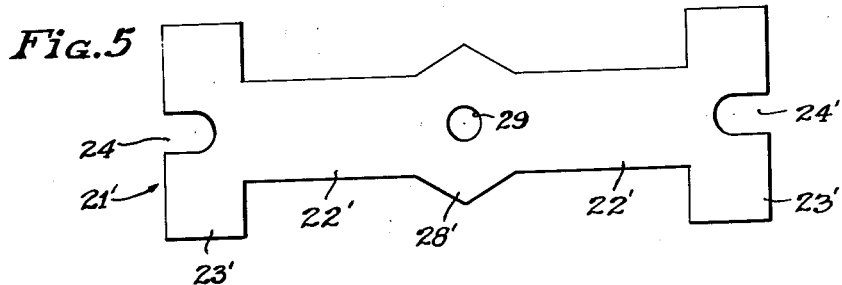
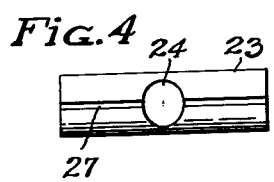
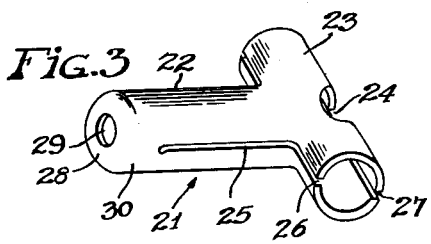
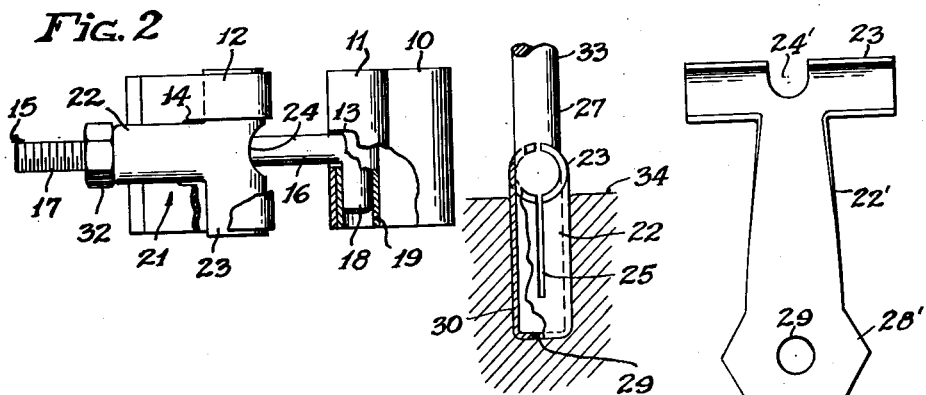
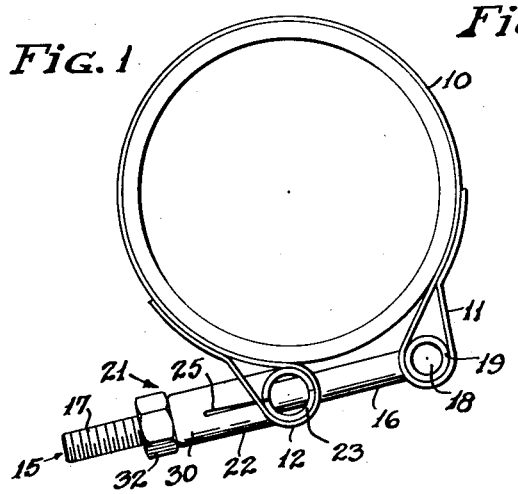
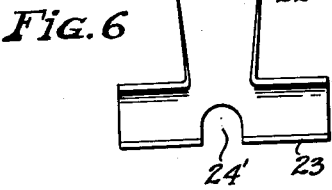
INVENTOR.
JAMES P. REYNOLDS
BY Lynn H. Latta
ATTORNEY- United States Patent Office 3,073,020
Patented Jan. 15, 1963

3,073,020
METHOD OF FORMING A ONE PIECE
TUBULAR T MEMBER
James P. Reynolds, Los Angeles, Calif., assignor to Aeroquip Corporation, Jackson, Mich., a corporation of Michigan
Filed Sept. 5, 1956, Ser. No. 608,051
2 Claims. (Cl. 29—531)

This invention relates to band clamps and in particular to band clamps of the type utilizing what is generally referred to as a "T-bolt and trunnion" type of take-up connector for drawing the ends of the band around an object to be clamped. A connector mechanism of this type, as disclosed in the patent to King No. 2,270,375, embodies a T-trunnion member of tubular construction fabricated in two parts, one of which is a formed sheet metal T and the other of which is a cap which is pressed onto the end of the stem of the T and functions to secure the formed halves of such stem against spreading.

The primary object of the present invention is to provide an improved take-up connector apparatus of this general type, embodying an improved T-trunnion part which is of one-piece construction instead of the composite two-piece construction shown in said patent.

More particularly, the invention contemplates a band clamp wherein the tension of a loop on the end of the band portion thereof functions to maintain the split portions of a drawn sheet metal trunnion against spreading, thus eliminating the necessity for a securing cap which has been considered necessary for many years in this art.

A further object is to provide an improved method of fabricating a one-piece hollow trunnion member of T-form.

Other objects will become apparent in the ensuing specifications and appended drawing in which:

FIG. 1 is an end view of a band clamp embodying the invention, as installed upon a tubular member;

FIG. 2 is a plan view of the same;

FIG. 3 is a perspective view of an improved one-piece T-trunnion member;

FIG. 4 is an end view of the T-trunnion;

FIG. 5 is a pattern view of the flat blank from which the trunnion is formed;

FIG. 6 is a view of the partially formed blank; and

FIG. 7 is a sectional view of a die set in which the final forming operation is effected.

Referring now to the drawing in detail, I have shown, as an example of one form in which the invention may be embodied, a band clamp embodying a sheet metal band 10 having at its respective ends, loops 11 and 12 formed by turning back the end portions of the band and securing them as by riveting or spot welding, to the adjacent body portions of the band. The loops 11 and 12 are provided with apertures 13, 14, to accommodate parts of the take-up connector mechanism which I will now describe.

The take-up connector mechanism embodies a T-bolt 15 (produced by a heading type of cold forging operation, normally referred to as "cold heading") including a shank portion 16 having a threaded end 17 and including a T-head 18 at its opposite end. T-head 18 is preferably provided with a split sleeve 19 which enlarges the head to the desired dimensions, and extends the length thereof, thus avoiding a fairly difficult heading operation which would be required in enlarging the end of the T-bolt itself to such dimensions.

The split sleeve 19 has an aperture through which the shank 16 of the T-bolt extends, and in the assembled connector mechanism the sleeve 19 is received in the band loop 11 while the T-bolt shank 16 extends through the aperture 13 of the loop.

The connector mechanism further includes the improved one-piece T-trunnion of my invention, indicated generally at 21 and embodying generally a central stem portion 22 and a cross head portion 23 which provides a pair of trunnions, separated by an aperture 24 that is aligned with stem 22. Stem 22 and cross head 23 are each constituted of a pair of semi-cylindrical sections separated by a slit 25 in stem 22 and slits 26 and 27 in cross head 23, all disposed in a common plane intersecting the axis of the T-trunnion 21.

The two halves of the trunnion are joined together by a cup shaped end web including a radial web portion 28 having an aperture 29 in its center, and including a cylindrical peripheral portion 30 of the same diameter as the opposed sections of stem 22 and forming a continuation thereof.

In the assembled clamp, the stem 22 extends through aperture 14 of loop 12, and the shank 16 of the T-bolt extends through apertures 24 and 29 of the trunnion, as shown. A nut 32 is threaded onto the threaded end portion 17 of shank 16, and operates to move the T-trunnion along the shank of the T-bolt toward the head thereof thus to take up the band, reducing the circumference thereof to obtain a constricting effect about a clamped article.

The invention is particularly characterized by the fact that the trunnions of cross head 23 are received in the respective halves of the loop 12, on either side of the opening 14, and the halves of the trunnions are drawn tightly against one another when the band is subjected to tension. Thus the necessity for independent means to maintain the halves of the cross head 23 in closed relation, is eliminated. The opposite end of the T-trunnion (the free end of stem 22) is closed by the connecting web portion 28, 30, and with both ends of the trunnion thus secured in closed position, the entire trunnion is effectively closed.

METHOD OF FABRICATING

In the fabrication of the T-trunnion 21, a blank 21' is first stamped from appropriate sheet metal in a blanking operation in which there is formed a diamond shaped, central web portion 28' having the hole 29 stamped therein, a pair of stem sections 22' extending from either end of the blank portion 28', and a pair of cross bar portions 23' on the remote ends of stem portions 22'. In the centers of cross head portions 23' are open slots 24' which, in the fully formed trunnions come together to form the aperture 24.

The blank 21' is then subjected to appropriate deburring and surface treatment operations preparatory to the forming operation.

In the forming operation, a series of forming steps are performed on the blank 21' beginning with a step wherein the cross bar portions 23' are formed into their final semi-cylindrical shape and stem portions 22' are partially formed to provide therein depressions that are graduated in depth from full depth adjacent cross bar 23' to substantially no depth adjacent web 28'.

In the ensuing operation, the central web 28' is subjected to a complete drawing operation between punch and die members 33, 34 (FIG. 7) to form the cup shaped web member 28, 30. In this final drawing operation the forming of the stem sections is completed by forming them about the punch of the drawing die. As this drawing operation progresses, the stem portions 22' will be folded toward the punch of the drawing tool and in the completion of the drawing operation the punch will be received in the slots 24' as the latter come together to form the aperture 24. The aperture 24 is larger than required to receive the T-bolt, the diameter being sufficient to allow the punch to be freely removed from the fully formed T-trunnion.

I claim:
1. The method of fabricating a one-piece tubular T member having a stem portion with a radial web portion at one end thereof and a cross head portion at its other end, comprising the steps of shaping a metal sheet to a flat blank having a central web, two elongate stem sections extending in diametrically opposed directions from the central web with the longer axes of the stem sections being aligned, each stem section having two straight and parallel side edges and an inner end and an outer or remote end, the stem sections being integral with the central web at their respective inner ends, two generally rectangular cross-bars integral with the stem sections respectively at the remote ends of the stem sections and extending at right angles to said axes, the cross-bars being longer than the width of the stem sections, each cross-bar having an outside edge defining respective remote end edges of the blank, each cross-bar having a slot formed therein and open in the remote end edge thereof and in axial alignment with the stem sections, the central web having a hole formed centrally therein, the central web having two side edges, the side edges of the central web diverging outwardly from the side edges respectively of one stem section to a medial line in the central web extending transversely of the said axes, the side edges of the central web converging inwardly toward the side edges respectively of the other stem section, said medial line defining two half portions of the blank, each half portion comprising a cross-bar and a stem section and one-half of the central web, said half portions being congruent; bending each cross-bar into a semi-cylindrical shape along the longitudinal axis thereof and bending the outer end of each stem section to a shape of semicircular cross section; drawing the central web into a cylindrical cup-shaped portion with the diameter of the cup-shaped portion being less than the diameter of said central web, thereby to form said radial web portion as the bottom of said cup-shaped portion with said radial web portion defining said hole; and during said drawing step, the step of folding said stem sections toward each other and forming them to semi-cylindrical shape with the side edges of one stem section being disposed adjacent and in alignment with respective side edges of the other stem section, and with the remote side edges of the cross-bars being disposed adjacent and in alignment with each other to define said cross-head portion.

2. The method of fabricating a one-piece tubular T member having a stem portion with a radial web portion at one end thereof and a cross head portion at its other end, comprising the steps of shaping a metal sheet to a flat blank having a central web, two elongate stem sections extending in diametrically opposed directions from the central web with the longer axes of the stem sections being aligned, each stem section having two straight and parallel side edges and an inner end and an outer or remote end, the stem sections being integral with the central web at their respective inner ends, two generally rectangular cross-bars integral with the stem sections respectively at the remote ends of the stem sections and extending at right angles to said axes, the cross-bars being longer than the width of the stem sections, each cross-bar having an outside edge defining respective remote end edges of the blank, each cross-bar having a slot formed therein and open in the remote end edge thereof and in axial alignment with the stem sections, the central web having a hole formed centrally therein, the dimension of said central web taken transversely of the line of the axes of the stem sections being greater than the width of the inner ends of the stem sections and substantially less than the length of the stem sections; bending each cross-bar into a semi-cylindrical shape along the longitudinal axis thereof and bending the outer end of each stem section to a shape of semicircular cross section; drawing the central web into a cylindrical cup-shaped portion with the diameter of the cup-shaped portion being less than the diameter of said central web, thereby to form said radial web portion as the bottom of said cup-shaped portion with said radial web portion defining said hole; and during said drawing step, the step of folding said stem sections toward each other and forming them to semi-cylindrical shape with the side edges of one stem section being disposed adjacent and in alignment with respective side edges of the other stem section, and with the remote side edges of the cross-bars being disposed adjacent and in alignment with each other to define said cross-head portion.

References Cited in the file of this patent
UNITED STATES PATENTS

| | | |
|---|---|---|
| 1,433,881 | Fancher et al. | Oct. 31, 1922 |
| 1,553,060 | Anderson | Sept. 8, 1925 |
| 1,586,626 | Johnson | June 1, 1926 |
| 2,045,327 | Laemmel | June 23, 1936 |
| 2,057,897 | Jencick | Oct. 20, 1936 |
| 2,120,118 | Smith | June 7, 1938 |
| 2,695,437 | Bernard | Nov. 30, 1954 |
| 2,727,292 | Houghton | Dec. 20, 1955 |